March 6, 1951 P. W. BRIDGMAN ET AL 2,544,414
HIGH-PRESSURE APPARATUS
Filed Nov. 22, 1946 5 Sheets-Sheet 1

FIG.1

Inventors
PERCY W. BRIDGMAN
RAYMOND R. RIDGWAY
EDWARD VAN DER PYL

March 6, 1951 P. W. BRIDGMAN ET AL 2,544,414
HIGH-PRESSURE APPARATUS
Filed Nov. 22, 1946 5 Sheets-Sheet 3

Inventors
PERCY W. BRIDGMAN
RAYMOND R. RIDGWAY
EDWARD VAN DER PYL
By George Crompton
Attorney March 6, 1951 P. W. BRIDGMAN ET AL 2,544,414
HIGH-PRESSURE APPARATUS
Filed Nov. 22, 1946 5 Sheets-Sheet 4

Inventors
PERCY W. BRIDGMAN
RAYMOND R. RIDGWAY
EDWARD VAN DER PYL
By George Crompton Jr.
Attorney March 6, 1951 P. W. BRIDGMAN ET AL 2,544,414
HIGH-PRESSURE APPARATUS
Filed Nov. 22, 1946 5 Sheets-Sheet 5

FIG. 14

Inventors
PERCY W. BRIDGMAN
RAYMOND R. RIDGWAY
EDWARD VAN DER PYL

By George Crompton Attorney

Patented Mar. 6, 1951

2,544,414

UNITED STATES PATENT OFFICE 2,544,414

HIGH-PRESSURE APPARATUS

Percy W. Bridgman, Cambridge, Mass., Raymond R. Ridgway, Niagara Falls, N. Y., and Edward Van der Pyl, Holden, Mass., assignors, by direct and mesne assignments, to Norton Company, Worcester, Mass., a corporation of Massachusetts Application November 22, 1946, Serial No. 711,570

25 Claims. (Cl. 18—17)

This invention relates to high pressure apparatus and with regard to its more specific features including apparatus for heating to high temperatures.

One object of the invention is to provide a quick acting auxiliary ram on a high pressure ram, the auxiliary ram working under low pressure and through a long distance, for quickly transferring a specimen to a mold thereafter to apply to it high pressure. Another object is to provide means for heating a specimen electrically and means for pressing the specimen before it has cooled. Another object is to provide apparatus automatically to buttress a ram head after it has moved so that great pressure can be applied thereto from a high pressure ram. Another object is to provide a structure of press ram and blocks which will transmit a tremendous force to a small piston or ram. Another object is to provide a combination of mold and a small piston to enter the mold with very strong reinforcing means for the mold and supporting means for the piston. Another object is to provide an arrangement of mold and rams operating under great pressure but so organized as to permit ready disassembly.

Another object of the invention is to provide a pair of electrodes for heating a specimen, automatic means for moving the specimen away from the electrodes, and a powerful press to subject the specimen to very great pressure before it has cooled. Another object is to provide compact apparatus for heating, transferring and pressing a specimen. Another object, in a heavy hydraulic press having a heavy cavity block, is to provide a quick acting ram to lift the block into an anvil. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein and the scope of the application of which will be indicated in the following claims.

In the accompanying drawings illustrating one of many possible embodiments of the mechanical features of the press and controls therefor and pressure molding apparatus.

Referring first to Figures 1, 2, 7, 10, and 11, the operating press has a massive iron base 20 having four massive projections 21 through which extend four heavy vertical steel shafts 22 that extend upwardly through four projections 23 of a massive iron cap 24. Gigantic nuts 25 are located on the lower screw threaded ends of the heavy vertical steel shafts 22 and similar nuts 26 are located on the upper screw threaded ends of these shafts 22. Thus the iron cap 24 and the iron base 20 are held in spaced relation to each other with a structural strength capable of resisting hundreds of tons of pressure trying to force them apart. To uphold the dead weight of the cap 24 shoulders 27 are provided on the shafts 22, while to prevent the base 20 from rising on the shafts 22 due to reaction, rebound, vibration or any unforeseen cause, shoulders 28 are provided on these shafts 22.

Held down by the cap 24 is a series of circular heavy steel plates 30 (five being shown) which encircle and reinforce a central cavity block 31 which constitutes the anvil or mold of the press. The dead weight of these plates 30 is taken by bars 32 which are supported by bolts 33 extending through lugs 34 formed on the cap 24. Nuts 35 and 36 hold the parts together. Sleeves 36a made of brass may be interposed between the top nuts 36 and the lugs 34 for cushioning rebound when the high pressure is released.

The apparatus of the invention in one of its aspects includes a large main hydraulic piston or ram 37, rectilinearly operated to move vertically upward to apply pressure, a smaller auxiliary hydraulic piston or ram 38 operating rectilinearly in a cylindrical bore 37a in the ram 37 and, mounted upon the auxiliary ram 38, a specimen piston or ram 39 of small diameter upon which is concentrated the entire tremendous pressure of the apparatus. The specimen 29 (Figure 13) in the cavity block 31 is compressed at pressures approaching 450,000 pounds per square inch by the action of fluid oil under pressure upon the main hydraulic ram 37 acting through the specimen ram 39.

Figure 1:
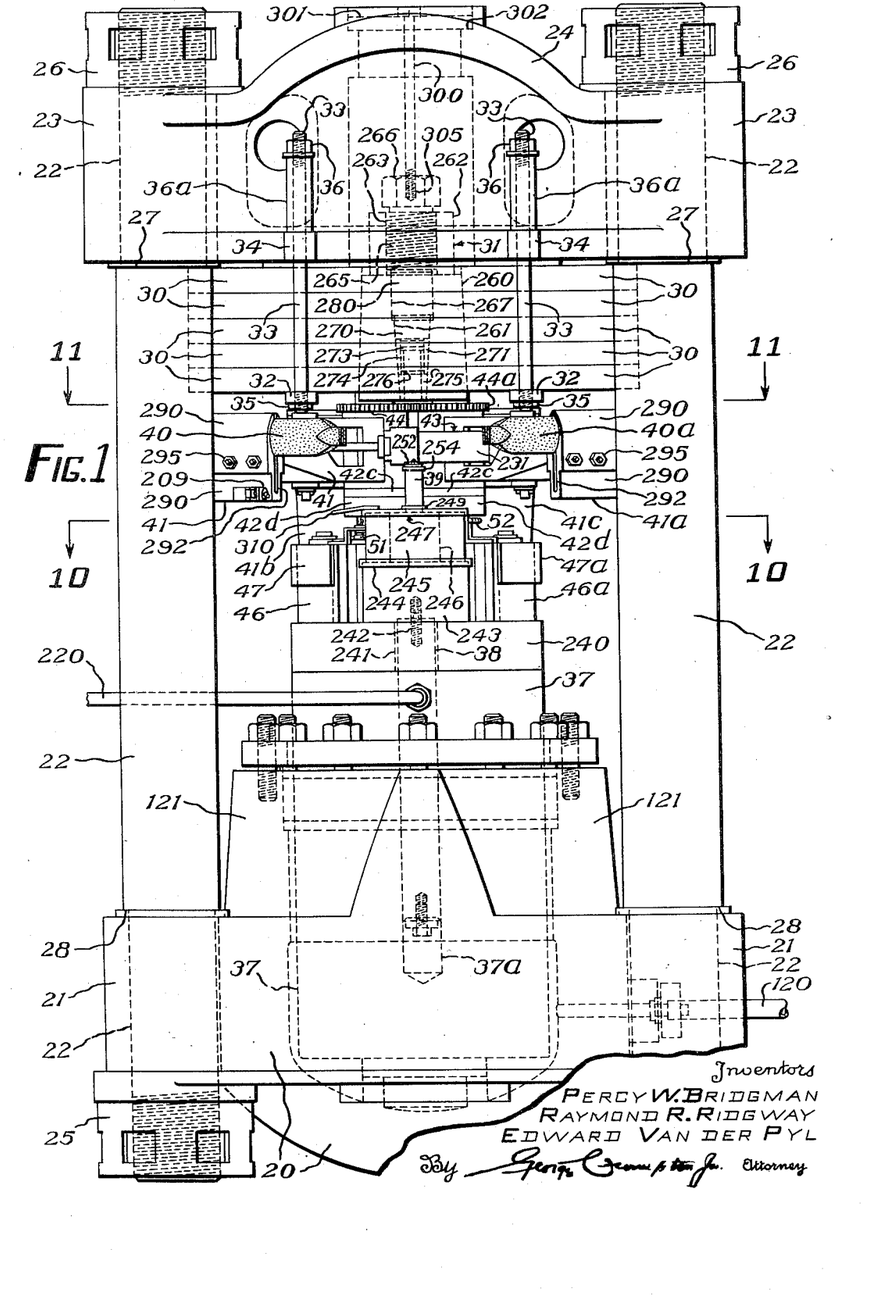
Figure 1 is a front elevation of the press.
Figures 2, 3, 4, 5, 6:
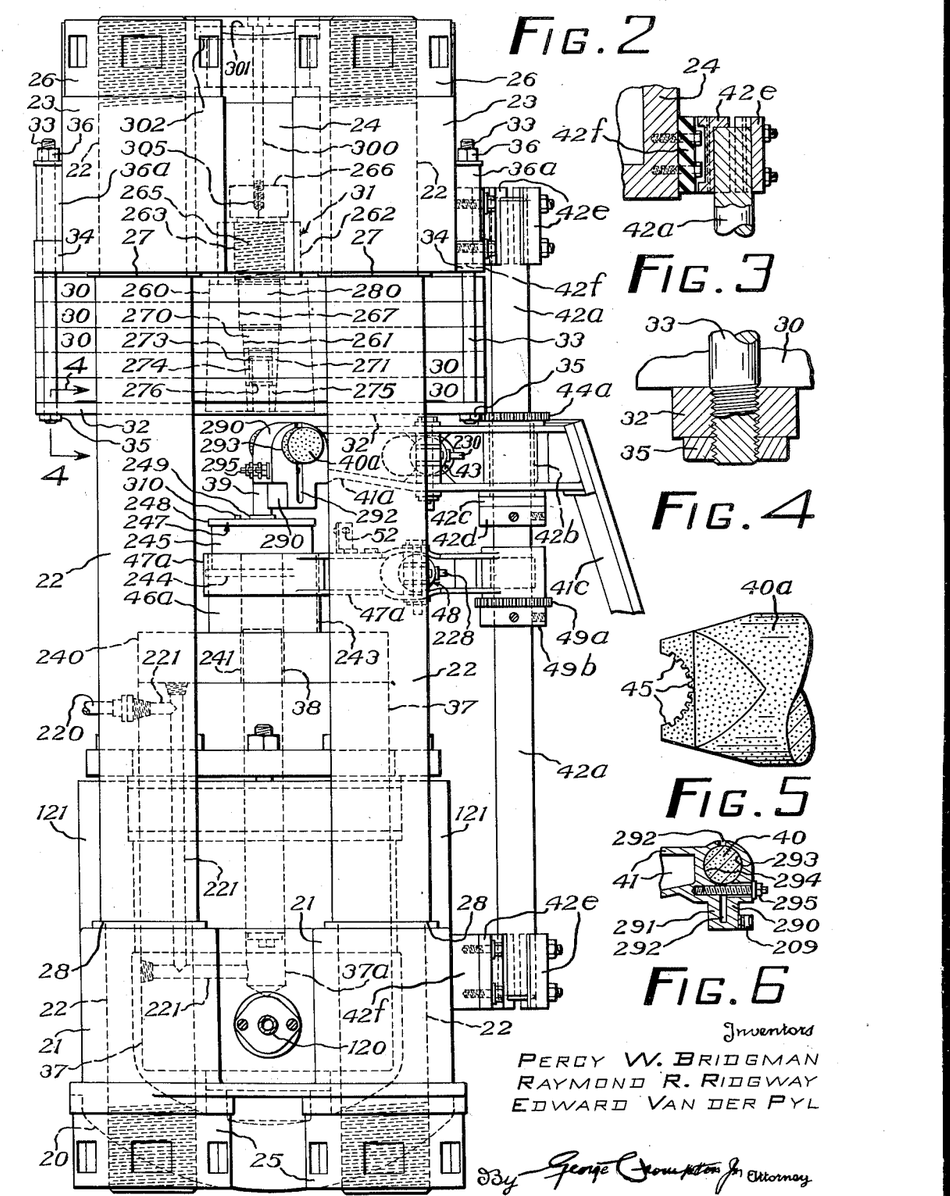
Figure 2 is a side elevation of the press.
Figure 3 is a fragmentary vertical cross sectional view taken along the line 3—3 of Figure 7.
Figure 4 is a fragmentary vertical cross sectional view on an enlarged scale taken along the line 4—4 of Figure 2.
Figure 5 is a large scale detail of one end of a heating electrode showing a bearing surface which grips the specimen.
Figure 6 is a fragmentary vertical cross sectional view taken along the line 6—6 of Figure 11.

Referring to Figures 1, 2, 3, 5, 6, 10, 11, 12, and 13, the apparatus of the invention includes two heavy heating electrodes 40 and 40a mounted upon a pair of electrode supporting arms 41 and 41a which are mounted upon two cylindrical vertical supporting bars or stanchions 42 and 42a. These arms 41 and 41a are actuated to swing horizontally apart and together angularly about the axes of the vertical supporting bars or stanchions 42 and 42a, by a small piston and cylinder unit 43 and are synchronized by gears 44 and 44a, the latter being adjustably mounted. The electrodes 40 and 40a may be swung toward each other to cause contact surfaces 45 thereof to grip a specimen 29 thus enabling the specimen to be heated to temperatures of the order of 2500° C. by the passage of electric current through it. The electrode arms 41 and 41a are well insulated from the vertical supporting bars 42 and 42a by means of fibre sleeves 42b and a fibre collar 42c, and the synchronous gears 44 and 44a are made of resinoid or other non-conducting material. Electric current is supplied to the electrodes 40 and 40a through two flexible bus bars 41b and 41c attached to the rear ends of the electrode arms 41 and 41a. Steel collars 42d on the bars 42 and 42a support the weight of the arms 41 and 41a and parts carried thereby and provide means for adjusting the arms vertically. Referring to Figures 2 and 3, the bars 42 and 42a are supported by brackets 42e which preferably are insulated by insulation 42f from the press.

One of the several steps of operation of the apparatus of the invention is to place a specimen to which heat and pressure are to be applied, between the electrodes which are swung together against it. The specimen may be cylindrical in shape, of the order of 1½ inches in diameter and of varying length. The specimen is held at the locus of the closed electrodes and then the electrode cylinder and piston unit 43 is actuated to cause the electrodes to grip the specimen. Current is then applied through the electrodes and the specimen is brought to the desired temperature. Pressure is then applied to the auxiliary ram from the hydraulic system hereinafter described, causing it to rise and pick up the specimen. Simultaneously a switch is automatically tripped by an arm carried by the auxiliary ram 38 causing the electrode arms to spread and release the specimen. The auxiliary ram continues up and inserts the specimen ram and specimen into the cavity block 31 and against its inner surface. At this stage, in a manner hereinafter described, a pair of split blocks 46 and 46a are inserted between the main ram and the auxiliary ram to form a solid column of metal between the main ram and the specimen so that high pressure may be exerted directly by the main ram upon the specimen 29. Then the high pressure is applied.

Referring to Figures 1, 2, 10, 11, and 12, pivotally mounted upon the cylindrical bars 42 and 42a are a pair of arms 47 and 47a which are connected by a cylinder and piston unit 48. Fluid oil operates this unit 48 both to separate said arms 47 and 47a and to bring them together. When they come together they move the split blocks into position to form the solid column of metal above referred to. Gears 49 and 49a synchronize the arms 47 and 47a, the gear 49a being adjustably mounted on its arm 47a. Mounted upon the arm 47 is a trip switch 51, and mounted upon the arm 47a is an adjustable operating rod 52. When the arms 47 and 47a have moved the split blocks into position as above described the rod 52 has just actuated the trip switch 51, which, in a manner hereinafter described, applies high pressure to the main ram 37. Steel collars 49b on the bars 42 and 42a support the arms 47 and 47a and provide for vertical adjustment.

One manner by which pressure may be generated in the hydraulic fluid to actuate the various rams of the apparatus is by the use of a hydro-pneumatic accumulator, an air compressor and air compression tank, an auxiliary low pressure hydro-pneumatic tank, a pair of low pressure hydro-pneumatic tanks, and a valve system consisting of solenoid operated, hand operated and pressure relief valves, together with high and low pressure oil fluid lines, and air pressure lines.

Figure 14:
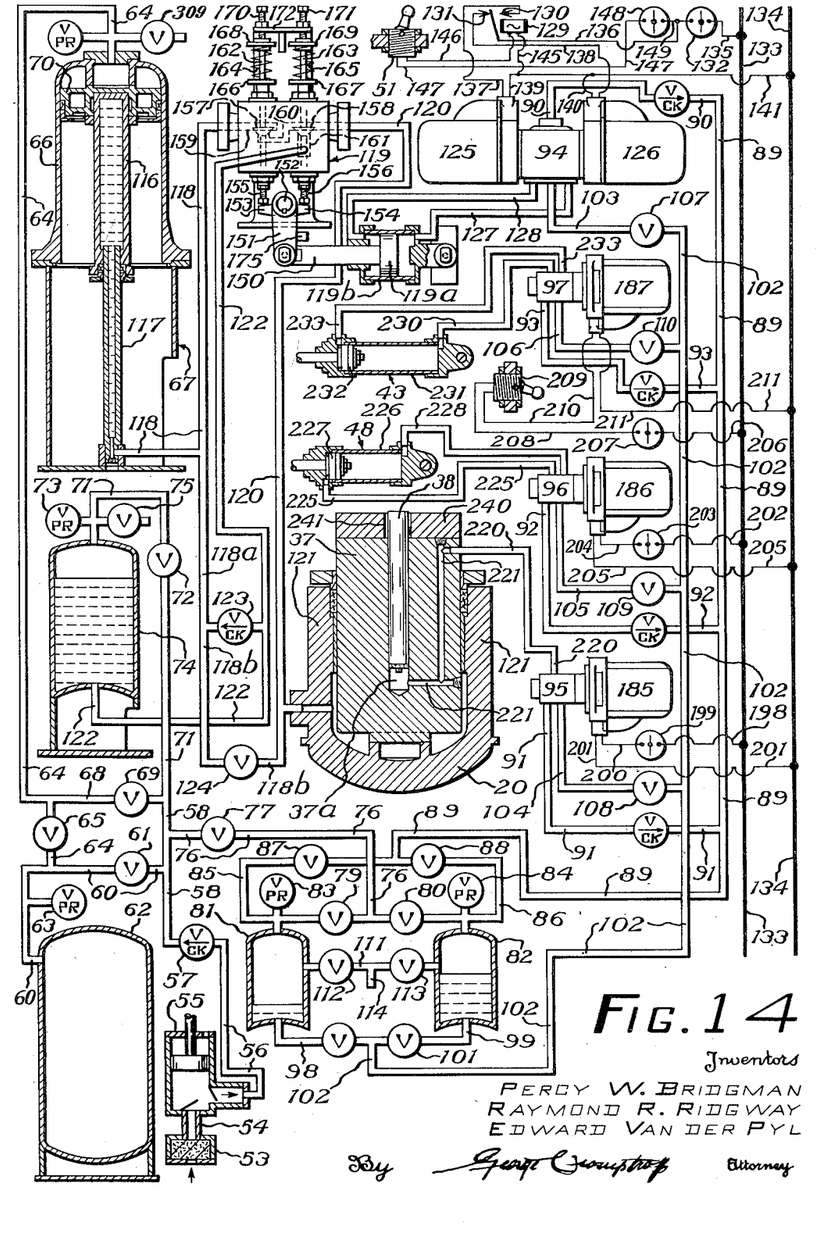
Figure 14 is a schematic diagram of the hydraulic pressure system which actuates the main hydraulic ram, the auxiliary hydraulic ram, the electrode arms and the ram block support arms.

Referring now to Figure 14, air is taken through an air cleaner 53 by pipe line 54 into an air compressor 55 where it is compressed and sent by pipe line 56 through a check valve 57, thence through a pipe line 58 which branches, a pipe line 60 leading through a hand operated valve 61 and thence into a large compressed air storage tank 62 there being a pressure relief valve 63 in the line 60. Connected to the line 60 is a pipe 64 running to a hand-operated valve 65 and extending into an air cylinder 66 of an accumulator 67. There is a by-pass pipe 68 which has a hand-operated valve 69, between the pipe 58 from the air compressor 55 and the pipe 64 between valve 65 and accumulator cylinder 66. Thus air may be pumped by the compressor 55, accumulated in the compression tank 62 under pressure, and thence lead into the accumulator cylinder 66 where it actuates a piston 70 of large diameter or air may be sent direct from the compressor 55 to the accumulator 67 for testing purposes and the like. Another branch 71 of the pipe 58 from the compressor 55 has a hand-operated valve 72, and a pressure relief valve 73, and is connected to the top of an expansion tank 74 which is partially filled to various depths with hydraulic fluid oil, as hereinafter explained, and upon which air pressure may be maintained. In the pipe 71 between the hand-operated valve 72 and the tank 74 there is a hand-operated air exhaust valve 75. The expansion tank 74 is provided in the line with the main tank 62 for the purpose of setting the main ram 37 in position to operate. It is also used to receive fluid oil exhausted from below the main ram 37 after the latter has been operated under high pressure, at which time the air valve 75 is set to exhaust.

Also, leading off the air compressor pipe 58 is another pipe 76 leading through a hand-operated valve 77, thence branching off through two hand-operated valves 79 and 80 into the top of two expansion or pressure tanks 81 and 82 which are partially filled at varying depths with fluid oil against which air pressure may be maintained for purposes hereinafter explained. The tanks 81 and 82 are part of the auxiliary low pressure ram system and control valve pressure system. In the pipes from valves 79 and 80 to tanks 81 and 82 respectively, are two pressure relief valves 83 and 84 at the tank tops. Pipes 85 and 86 at the top of tanks 81 and 82 connect to hand-operated valves 87 and 88 and merge into a pipe 89. The pipe 89 connects to the fluid exhaust outlet pipes 90, 91, 92 and 93 of four solenoid operated valves 94, 95, 96 and 97, whose function and operation will be hereinafter explained. From the bottom of the pressure tanks 81 and 82 pipes 98 and 99 connect to hand-operated valves 100 and 101 and then merge into a pipe 102 to lead the fluid to pressure intake pipes 103, 104, 105 and 106 of each of the solenoid operated valves 94, 95, 96 and 97. Each of said pressure intake pipes is controlled by hand-operated valves 107, 108, 109 and 110 respectively. Between tanks 81 and 82 runs a by-pass pipe 111 having hand-operated valves 112 and 113 between which is connected an air exhaust pipe 114.

Thus by alternate settings of hand-operated valves a system of high and low pressure or pressure side and exhaust side can be established as between the tanks 81 and 82 using them alternatively for fluid oil pressure and exhaust to and from the solenoid operated valves 94, 95, 96, and 97. While one tank is set for the pressure side compressed air is let into the top of the tank from the compressor 55 by means of appropriate valve settings, while the air to the other tank, which is to be used as a fluid oil exhaust is shut off. The fluid oil exhaust is by way of either valve 87 or 88. Air pressure on the fluid oil in the pressure tank forces the oil into the line 98 or 99 (depending upon which tank is the pressure tank) thence to the fluid oil pressure intake pipes 103, 104, 105, and 106 of the solenoid operated valves 94, 95, 96 and 97 by proper valve settings in the line. While the other tank is being used for the exhaust return from the solenoid operated valves 94, 95, 96 and 97, the valves are set so that oil will flow from the fluid oil exhaust outlet pipes 90, 91, 92, and 93 of these solenoid operated valves 94, 95, 96, and 97 into the top of the exhaust tank. The line 98 or 99 on the bottom of the exhaust tank 81 or 82 is closed off by either valve 100 or 101 depending upon which tank is the oil receiving tank, and the air exhaust valve either 112 or 113, depending upon which tank is the oil receiving tank, is operated so as to exhaust the air through exhaust 114 at atmospheric pressure as the exhaust tank fills with oil exhausted from the solenoid operated valves 94, 95, 96 and 97.

Referring still to Figure 14, the main hydraulic ram or piston 37 is actuated by fluid oil placed under extremely high pressure by the accumulator 67, and it is controlled by a main hydraulic valve 119, which in turn is actuated by the solenoid operated valve 94. As previously described, air under pressure in cylinder 66 of accumulator 67 acts upon the piston 70 of large diameter to force it down. A cylinder 116 of small diameter is under the piston 70 and is therefore forced down by piston 70. This cylinder 116 surrounds a stationary hollow piston 117, and when the cylinder 116 moves down it places fluid oil in the cylinder 116 and piston 117 under great pressure, driving it out through a pipe line 118, through the main hydraulic control valve 119 if it is open, thence through a pipe line 120 into a cylinder 121 which contains the main ram 37. When valve 119 is closed the main ram 37 is held stationary in position. When valve 119 is placed in exhaust position, the fluid oil from the main ram cylinder 121 flows out through pipe 120 through valve 119, thence through an exhaust pipe 122 into the bottom of the expansion tank 74 which may fill with oil provided the air exhaust valve 75 is open. This allows the main hydraulic ram 37 to recede in its cylinder 121.

The expansion tank 74, besides being a reservoir to receive oil when the ram 37 is lowered, can be used to refill the accumulator 67 and also to move the main ram 37 upwards to its starting position (which is somewhat above its bottom position). To perform the first of these functions the tank 74 is placed under air pressure from the compressor 55 and the oil then flows by way of the pipe 122 and a check valve 123 to a branch 118a of the pipe 118, thence through pipe 118 into the accumulator 67. To perform the other function, oil from the tank 74 flows via pipe 122, check valve 123 through a branch pipe 118b and a hand operated valve 124 to the cylinder 121.

Referring still to Figure 14, the main hydraulic ram control valve 119 which controls the flow of fluid oil under pressure to the main ram 37 is actuated by a piston 119a in a cylinder 119b which in turn is actuated by hydraulic pressure from one or the other of the tanks 81 and 82 in the valve control system depending upon which tank is the pressure tank. The valve 119 is operated by the double solenoid operated valve 94 to closed or neutral position, pressure position, or exhaust position. When one solenoid 125 of valve 94 is energized the other 126 is de-energized and vice-versa. When solenoid 125 is energized and solenoid 126 is de-energized, a pipe 127 is connected to pressure and a pipe 128 is open to exhaust. The pressure in pipe 127 actuates piston 119a positioning valve 119 in the pressure position. Fuid oil pressure may then flow from accumulator 67 through pipe 118 to valve 119, and into pipe 120 to actuate and drive the main hydraulic ram. When solenoid 126 is energized and solenoid 125 is de-energized, fluid oil pipe 118 is closed and fluid from the cylinder 121 of the main hydraulic ram flows through pipe 120 into valve 119 exhausting through line 122 into the expansion tank 74. When valve 119 is in its mid position as shown in Figure 14 it is closed, and oil can not pass through it in any direction.

For the energization of the solenoids 125 and 126 there are provided a relay 129 having terminals 130 and 131 and a snap switch 132. A pair of A. C. lines 133 and 134 constitute the source of electrical energy for the solenoids 125, 126 and for the relay 129 as well as for other electrical circuits and devices to be later described. From line 133 a wire 135 leads to snap switch 132 while from snap switch 132 a wire 136 extends to the switch arm of the relay 129. Terminal 130 is connected by a wire 137 to the solenoid 125 while terminal 131 is connected by a wire 138 to the solenoid 126. The circuits are completed to the solenoids 125 and 126 by wires 139 and 140 which are connected to a wire 141 which extends to the A. C. line 134. It will now be seen that when the switch arm of the relay 129 makes contact with terminal 130, the solenoid 125 will be energized, provided the snap switch 132 is closed. Similarly, when the switch arm of the relay 129 makes contact with the terminal 131, the solenoid 126 will be energized, provided the snap switch 132 is closed.

When the relay 129 is energized, the switch arm thereof makes contact with the terminal 130. When the relay 129 is deenergized, a spring (not shown) causes the switch arm to make contact with the terminal 131. Energization and de-energization of the relay 129 is controlled by the trip switch 51 which, as previously described, is operated by the split block support arms 47 and 47a. Still referring to Figure 14, a wire 145 extends to relay 129 from the wire 141 connected to line 134. From the other side of the relay 129 a wire 146 goes to the trip switch 51 while another wire 147 extends from the trip switch 51 to a snap switch 148. From the snap switch 148 a wire 149 leads to the wire 136 which is connected to the snap switch 132 and thence, by wire 135, to the line 133. Thus the relay 129 is energized whenever all of switches 51, 132 and 148 are closed, otherwise it is de-energized.

Referring still to Figure 14, the manner in which the valve 94 controls the valve 119 and the manner in which the valve 119 controls the flow of fluid will not be more particularly described. It will be remembered that the middle bottom pipe 103 supplies fluid under pressure to the valve 94 and that the top pipe 90 leads to exhaust. The left hand bottom pipe 128 goes directly to the left-hand end of the cylinder 119b. The right hand bottom pipe 127 goes directly to the right hand end of the cylinder 119b. When the solenoid 125 is energized, pipe 127 is connected to pressure pipe 103 and pipe 128 is connected to exhaust pipe 90. Conversely when solenoid 126 is energized, pipe 128 is connected to the pressure pipe 103 and pipe 127 is connected to the exhaust pipe 90.

The piston 119a in the cylinder 119b is connected by a piston rod 150 to a rock lever 151 which is keyed to a rock shaft 152. A pair of arms 153 and 154 form a lever which is also keyed to the rock shaft 152. The arms 153 and 154 respectively engage adjustment studs 155 and 156 on the ends of the stems of poppet valves 157 and 158. As indicated in Figure 14 the poppet valve 157 seats between a chamber 159 connected to the pipe 118 and a chamber 160, connected to the pipe 120, while the poppet valve 158 seats between the chamber 160 and a chamber 161 connected to the pipe 122. When the trip switch 51 is automatically operated, the relay 129 is energized (if the snap switches 132 and 148 are closed) thus energizing the solenoid 125, which operates the valve 94 to send the fluid under low pressure to the right hand side of piston 119a which then moves to the left, moving arm 153 against stud 155 and opening the poppet valve 157 which connects chambers 159 and 160. But when either of the switches 51 and 148 is opened the relay 129 is de-energized so that the solenoid 125 is de-energized while the solenoid 126 is energized provided the switch 132 is closed, and the valve 94 sends fluid under low pressure to the left hand side of the piston 119a which moves to the right moving arm 154 against stud 156 and opening the poppet valve 158 which connects chambers 160 and 161.

Whichever poppet valve 157 or 158 is not positively opened as above described remains closed. As shown in Figure 14 rods 162 and 163 extend from the outside to the inside of the casing of the valve 119 and are surrounded by springs 164, 165. The rods 162 and 163 engage the heads of the poppet valves 157 and 158. The springs 164 and 165 engage washers 166 and 167 that abut shoulders on the rods 162 and 163 and they also engage collars 168 and 169 which are slidably mounted on the rods 162 and 163 but prevented from rising by adjustment screws 170 and 171 extending through a stationary bar 172.

Various ways of holding the rock lever 151 in its median position might be adopted but the way actually used has been to provide a removable stop 175 and then set the switches to move the rock lever 151 against the stop. A piece of heavy pipe, a crow bar or any other piece of heavy iron can be used for the stop 175. With the rock lever 151 in this median position both valves 157 and 158 remain closed.

It will be remembered that the pipe line 102 is a low pressure pipe line with a branch 104 to the valve 95, a branch 105 to the valve 96 and a branch 106 to the valve 97. It will also be remembered that the pipe 89 is an exhaust pipe and has a branch 91 from the valve 95, a branch 92 from the valve 96, and a branch 93 from the valve 97. These valves 95, 96 and 97 are structurally identical and are four port piston valves, whereby pressure may be connected to either of two lines and exhaust opened to the other, which of the two lines receives pressure and which is open to exhaust depending on the position of the piston which has only two operating positions. Since such valves are now well known to the hydraulic arts it has not been deemed necessary to show the cross sectional views. In the case of the valve 95 one of the ports which sends fluid for operating purposes has been plugged up leaving only one operating port. The valves 96 and 97 each have two operating ports.

The valve 95 has an operating solenoid 185, the valve 96 has an operating solenoid 186 and the valve 97 has an operating solenoid 187. From the A. C. line 133 a wire 198 leads to a snap switch 199 and from the snap switch 199 a wire 200 leads to one end of the winding of the solenoid 185. From the other end of this winding a wire 201 leads to the A. C. line 134. Similarly solenoid 186 is controlled by a simple circuit consisting of wire 202, snap switch 203, wire 204 and wire 205. Solenoid 187 is controlled by a circuit including a wire 206 from A. C. line 133 to a snap switch 207, a wire 208 to a trip switch 209, a wire 210 from the trip switch 209 to the solenoid 187 and a wire 211 from the solenoid 187 to the A. C. line 134.

When the solenoid 185 is energized the valve 95 is operated to connect pressure pipe 104 to a flexible pipe 220 which is connected to a passage 221 in the ram 37, which passage is connected to the cylindrical bore 37a containing the auxiliary ram 38. When the solenoid 185 is de-energized the valve 95 moves to connect the pipe 220 to exhaust pipe 91. When the solenoid 186 is energized the valve 96 is operated to admit fluid from the pressure pipe 105 to a pipe 225 which leads to one end of the cylinder 226 of the unit 48, moving the piston 227 in the cylinder 226 to contract the unit thus bringing together the block moving arms 47 and 47a. At the same time a pipe 228 from the other end of the cylinder 226 is connected to exhaust pipe 92 via the valve 96. Conversely, when the solenoid 186 is de-energized, pipe 105 is connected to pipe 228 while pipe 225 is connected to pipe 92 and the unit 48 expands.

In similar fashion when the solenoid 187 is energized, the pressure pipe 106 is connected to a pipe 230 leading to one end of the cylinder 231 of the unit 43 which connects the electrode arms 41 and 41a, and the piston 232 in the cylinder is moved to expand the unit, fluid exhausting through a pipe 233 to the valve 97 and out the pipe 93. And when the solenoid 187 is de-energized, the circuit is reversed and the unit 43 contracts.

Figures 7, 8, 9:
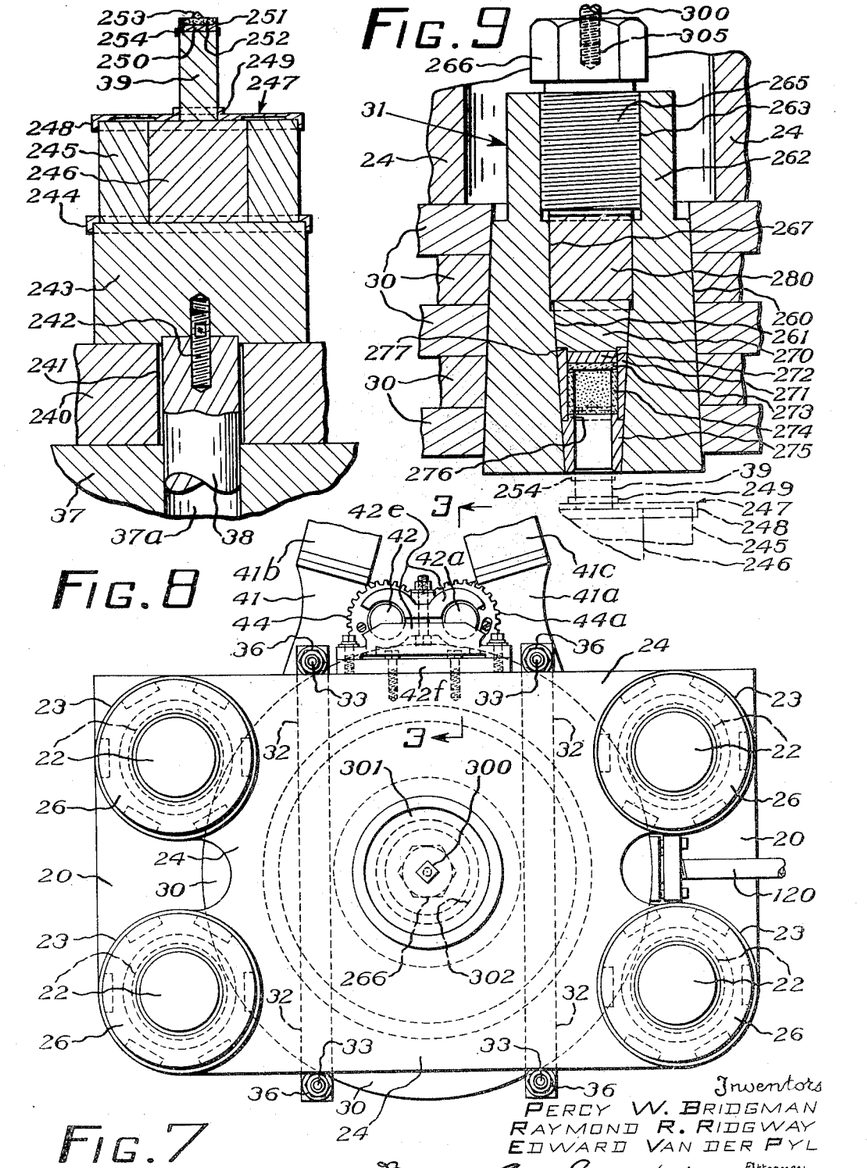
Figure 7 is a plan of the press.
Figure 8 is a fragmentary vertical axial sectional view on an enlarged scale of the main ram, auxiliary ram, specimen ram and associated parts.
Figure 9 is a fragmentary vertical axial sectional view on an enlarged scale of the cavity block and reinforcing plates therefor, and of the mold parts and plug.

Referring now to Figures 8 and 14, mounted upon the top of main hydraulic ram 37 is a ram head 240 which as shown may be a large cylindrical block of cast iron or steel with a central hole 241 through which the auxiliary ram 38 passes. Secured to the top of the auxiliary ram 38 by means of a bolt 242 in an auxiliary ram head 243 which may also be a large cylindrical block of cast iron or steel. This ram head 243 overlies the ram 38 for a purpose which will presently appear. Seated upon the auxiliary ram head 243 is a centering ring 244 which positions an annular cylindrical piece of steel 245 in concentric relation to the head 243.

The annular piece of steel 245 is a retainer for a block 246 of cemented tungsten carbide or other hard and strong material in which is concentrated the enormous pressure developed by the main ram 37. This block 246 which is a cylinder has smooth end surfaces and the lower surface thereof rests upon the upper smooth surface of the ram head 243. The cylindrical block 246 fits with a nice fit inside the annular cylindrical piece of steel 245 which prevents the block 246 from bursting under the pressure.

On top of the annular piece 245 and the block 246 (which have the same length and therefore present a common top plane surface) is a centering plate 247 having a rim 248 overlying the piece 245 and a hub portion 249 with an interior cylindrical surface in which is seated the specimen ram 39 which is likewise made of cemented tungsten carbide or other hard material possessing the necessary strength. The cemented tungsten carbide referred to is WC bonded with cobalt and used for machine tool bits which is available on the market.

On top of the specimen ram 39 (which is a solid right circular cylinder with bases normal to its axis) is a steel disc 250 which has a lip 251 the outside of which is a continuation of the cylindrical surface of the disc and the inner side of which is a portion of an inner conical surface. This disc 250 takes the full pressure and will expand somewhat thereunder to seal the mold. On top of the steel disc 250 and nicely fitting it is a ceramic disc 252, the diameter of which is the same as that of the disc 250 and the specimen ram 39. Formed integral with the ceramic disc 252 and on top of it in the center thereof is a ceramic cone 253. The material of the disc 252 and its cone 253 may be ceramic bonded alumina or silicon carbide, or merely a good grade of ceramic brick, provided it is reasonably highly refractory, and many other refractory materials might be used.

As a means for aligning the disc 250 on the ram 39 there is provided a brass ring 254 which merely moves down as the ram 39 goes into the mold.

Referring now to Figure 9, the cavity block 31 is a massive piece of steel having a gently tapered exterior conical surface 260 which fits the taper of the inside of the plates 30. Thus the pressure causes a reaction which compresses the cavity block radially and the great width of the plates 30 provides adequate strength to resist the action without splitting the plates. The inner surface 261 of the lower part of the cavity block 31 is conical but tapered in the opposite direction so that the pressure will not weld the parts together. Thus despite the use of pressures up to 30,000 atmospheres it has been possible to disassemble the mold parts from the cavity block.

The upper portion 262 of the cavity block 31 is cylindrical outside and has a cylindrical screw threaded bore 263 inside. The thread is massive and strong. In the bore is a large steel plug 265 which is threaded likewise with a massive strong thread. The plug 265 has a large hexagonal head 266 by means of which it may be screwed into place with great pressure and later removed. Adjacent the threaded bore 263 and between it and the conical surface 261 is a cylindrical bore 267 of the cavity block 31.

Fitting in the cavity block 31 against the conical surface 261 thereof are mold parts comprising, from top to bottom, a tapered anvil member 270, a top tapered mold liner 271, a plate 272, a refractory plate 273, an inner refractory liner 274 and a bottom tapered mold liner 275. All of these parts are preferably made of steel except those indicated as refractory which may be made of any highly refractory material as ceramic bonded alumina or ceramic bonded silicon carbide. The bottom mold liner 275 has a lip 276 outside of which fits the top mold liner 271 and this leaves a shoulder for seating the refractory liner 274. The tapered anvil member 270 has a shoulder 277 on the bottom outside of which the liner 271 fits. All of these parts are spaced from the screw threaded plug 265 by means of a cylindrical steel plug 280 in the bore 267. The anvil member 270 has a top surface which is slightly above the bottom of the bore 267 so that the plug 280 can never bottom and thus no matter how much the screw plug 265 is tightened, the thrust is taken by the tapered parts. This entire construction permits easy assembly and disassembly.

The diameter of the piston 70 of the accumulator 67 was 32" while the diameter of the piston 117 of the accumulator 67 was 5.5". The theoretical multiplication of pressure in this accumulator therefore was 33.85. The diameter of the main ram 37 was 20" while the diameter of the specimen ram 39 was 1½". This gives a multiplication of pressure of 177.77. The product of these multiplications of pressure is 6018.

It follows that to obtain a pressure of 30,000 atmospheres upon the specimen the tank 62 should have a pressure of 73.4 pounds per square inch. However this makes no allowance for friction in the accumulator and elsewhere, nor for the weight of the ram 37. Accordingly, a pressure of about 85 pounds per square inch is provided in the tank 62 to obtain 30,000 atmospheres against the specimen. The pressure of 85 pounds per square inch is by no means a high pressure and may easily be obtained with a small air compressor with a driving motor of three to five H. P. which will bring the pressure in the tank 62 up to 100 pounds per square inch in a couple of hours.

The current through the electrodes 40 and 40a may be derived from a single phase line operating at 60 cycles with 2300 volts pressure. A transformer is used to step down to 15 volts. The current through the specimen has been from 1,000 amperes to 10,000 amperes.

In order to distribute such high currents through the specimen the electrodes have a plurality of contact surfaces 45. These contact surfaces 45 are on the ends of teeth formed in the otherwise cylindrical surfaces of the electrodes. By so shaping the electrodes the heavy currents above mentioned can be used and will heat the specimen to temperatures up to 2300° C. or 2500° C. and sometimes higher.

Referring now to Figure 6 the electrodes 40 and 40a are firmly gripped by the arms 41 and 41a. As shown in Figure 6 in the case of the arm 41 there is an outer portion 290 which is separated from an inner portion 291 of the arm 41 by means of a slot 292. The portion 290 has a semi-cylindrical surface 293 and the portion 291 has a semi-cylindrical surface 294. These surfaces are drawn against the electrodes 40 by means of bolts 295 which draw together the portions 290 and 291 thus clamping the electrodes. The arms 41 and 41a respectively are preferably made of aluminum which has high current carrying capacity and is light.

To operate the apparatus, the various mold parts are placed in the cavity block 31 and then the threads of the screw plug 265 are coated with a mixture of graphite and glycerine. The bottom of the plug 265 is likewise coated and a layer of lead is placed on the coating. The screw plug 265 is then tightened with a powerful wrench.

The specimen ram 39, annular piece of steel 245, block 246, and auxiliary ram head 243 are then removed so that the ram head 240 is the top part of the movable elements of the press. The cavity block 31 is now placed upon the ram head 240, base down and plug 265 on top, and carefully centered. The exterior conical surface 260 of the cavity block 31 is now painted with graphite and glycerine, a large sheet of lead foil is wound upon it and carefully trimmed, and a second application of graphite and glycerine is made over the lead foil.

One of the tanks 81 and 82 has been established as a pressure tank and contains oil and air under pressure. The switch 199 is now closed and this moves upwardly the auxiliary ram 38 (its head 243 has been removed as noted). The ram 38 carries the cavity block 31 into the conical hole in the plates 30 with light pressure. The cavity block is now secured in place so that it will not drop down when the auxiliary ram 38 is lowered, as follows.

Referring now to Figure 1, a long bolt 300 extends through a centrally located hole in a plate 301 which fits in an annular seat 302 in a large hole in the cap 24 of the press. The plate 301 is first put in position and then the bolt 300 is dropped through the hole and screwed into a threaded hole 305 in the head 266 of the plug 265. The bolt 300 can not drop because its head is larger than the hole in the plate 301. The bolt 300 is tightened to hold the cavity block in place and then the auxiliary ram 38 is lowered by opening the switch 199.

Figures 10, 11, 12, 13:
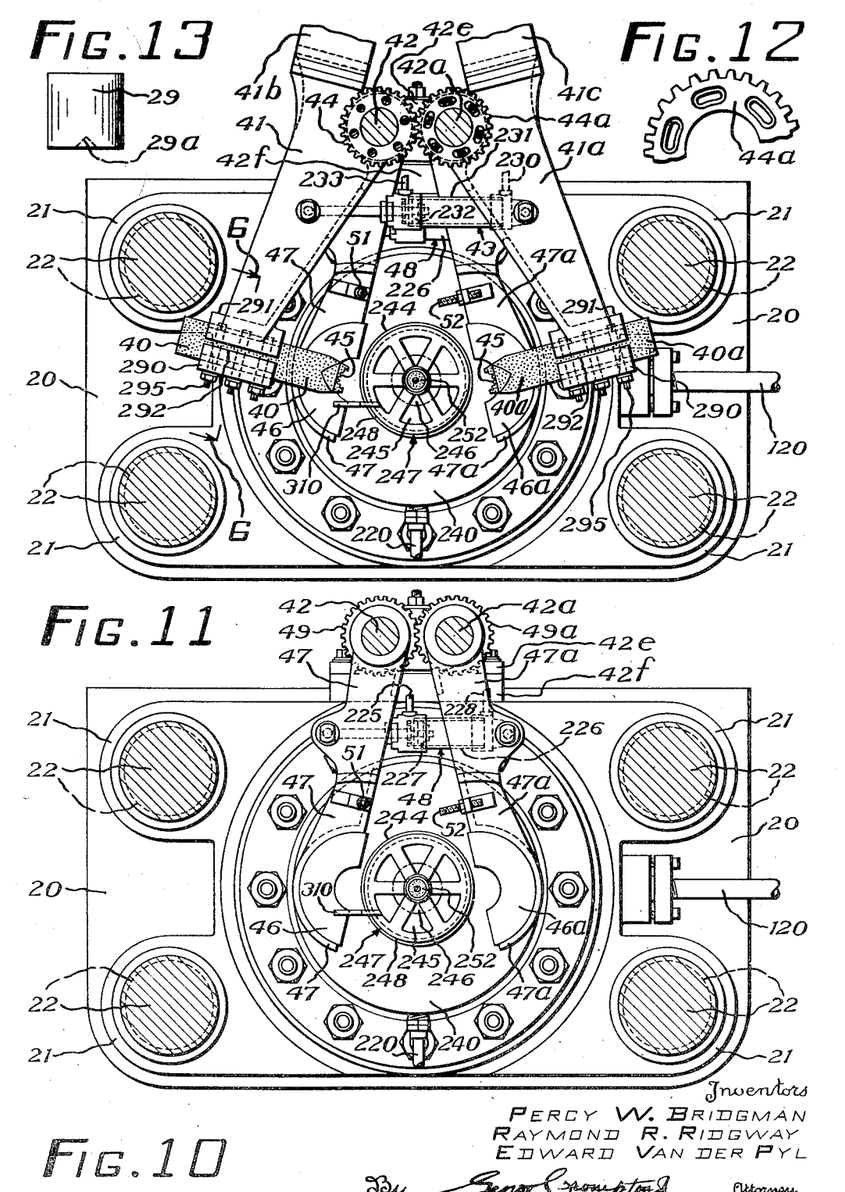
Figure 10 is a horizontal cross sectional view taken along the line 10—10 of Figure 1.
Figure 11 is a horizontal cross sectional view taken along the line 11—11 of Figure 1.
Figure 12 is a fragmentary plan view of an adjustable gear of the arm synchronizing gears for the electrode arms and the ram block arms.
Figure 13 is an elevation of a specimen.

Now the parts that were removed are replaced so that the assembly is as shown in Figure 8. It is assumed that the tank 74 contains some oil and a pressure of about 40 pounds was established therein. The arms 47 and 47a are set in open position which is done by opening the switch 203. Now the split blocks 46 and 46a are set on top of the ram head 240 and in the arcuate portions of the arms 47 and 47a as shown in Figure 10. Now the valve 124, which is a needle valve, is opened slightly and this very slowly moves upwardly the ram 37 under oil pressure from the tank 74. This upward movement of the ram 37 is stopped when the tops of the blocks 46 and 46a are just below the lowest points of the arms 41 and 41a. All this time and thereafter until automatically operated the main valve 119 is in neutral position, namely the position shown in Figure 14, with the valves 157 and 158 closed. This valve 119 will, when there is no pressure in the cylinder 119b remain in neutral position with both the poppet valves 157 and 158 closed.

The valve 124 having been closed, the compressor 55 is now operated with the valves 61, 69, and 77 closed and the valve 72 open to raise the pressure in the tank 74 to around 200 pounds. Referring now to the top of Figure 14 at the left, a valve 309 is now opened (the valve 65 being closed) and fluid from the tank 74 fills the accumulator piston 117 and accumulator cylinder 116 raising the accumulator piston 70 to the position shown in Figure 14. The tank 74 may now be assumed to be nearly empty of oil and the valve 75 is now open to let the air out of the tank 74. This valve 75 is left open.

It has already been stated that one of the tanks 81 and 82 has been under pressure. The pressure used is of the order of 150 pounds which may be established directly from the compressor 55. At some time the tank 62 is brought to the desired pressure. The valve 77 having been closed, the valves 65, 69, and 72 are likewise closed and the valve 61 is opened. Now the compressor 55 is used to raise the pressure in the tank 62 to the desired amount, for example, 85 pounds. The valves 309, 61 and 69 are now closed and the valve 65 is opened. This places the piston 70 under the full pressure of the tank 62, but nothing happens because fluid can not exhaust through the pipe 118 as outlets are blocked by valve 157, check valve 123 and valve 124. Nevertheless, the system is now set so that whenever the solenoid 125 is actuated the valve 94 admits a pressure of about 150 pounds to the pipe 127 into the cylinder 119b which moves the piston 119a to open the valve 157 which permits the very high pressure from the accumulator 67 to pass through the main valve 119 into pipe 120 and thus into the main cylinder 121 raising the main ram 37.

The arm 151 is now blocked on the right hand side so that it can not move beyond the neutral position. This in practice is done with a piece of steel jammed between the arm 151 and an abutment, and in such position that when the arm 151 moves to the left the piece of steel simply falls to the floor. The trip switch 51 is then placed in the off position and the switches 132 and 148 are closed. This energizes the solenoid 126 and opens the valve 94 to admit pressure through the pipe 128 but nothing happens because the piston 119a can not move. Now, whenever the trip switch 51 is closed, the solenoid 126 will be de-energized and the solenoid 125 will be energized which will open pipe 127 to pressure and pipe 128 to exhaust.

The switch 199 has been open since the cavity block 31 was placed in position. The switch 207 and the trip switch 209 are now closed which operates the solenoid 187 and therefore the valve 97 to expand the piston cylinder unit 43 to spread apart the electrode arms 41 and 41a. A specimen 29 having been selected, it is held by hand between the electrodes 40 and 40a and one of the switches 207, 209 is manipulated to open the circuit and cause the unit 43 to contract thus bringing the electrodes 40 and 40a together with the contact points 45 gripping the specimen. When this has been done the trip switch 209 is set in open position while the hand switch 207 is closed. Now whenever the trip switch 209 is closed the electrodes 40 and 40a will fly apart, but in the meanwhile they press against the specimen. The trip switch 209 will be operated by an arm 310 which is part of the centering plate 247. The trip switch 209 is carried by the portion 290 of the electrode arm 41 as shown in Figures 1 and 6.

The switch 203 is now closed, having previously been open. This energizes the solenoid 186 which moves the valve 96 to admit fluid through the pipe 225 to contract the piston and cylinder unit 48. This causes the arms 47 and 47a to come together until the split blocks 46 and 46a strike the auxiliary ram head 243 which stops further action. The switch 203 is left closed with the split blocks hugging the head so that when the head 243 has risen above the level of the split blocks 46 and 46a they will suddenly move inwardly enclosing the ram 38 and forming a support between the main ram head 240 and the auxiliary ram head 243. It may be noted that the friction of the head 243 on the blocks 46 and 46a will not raise them because there is an equal friction of the blocks against the arms 47 and 47a and the dead weight of the blocks prevails.

The press will now fire whenever the switch 199 is closed. But before that is done, the specimen 29 is heated. The main heating current is now directed through the bus bars 41b, 41c, the arms 41 and 41a and the electrodes 40 and 40a and through the specimen 29. Energy up to 75 kilowatts may be used and the specimen soon becomes very hot. It is preferably watched with an optical pyrometer and when the desired temperature has been reached, for example 2500° C., the current through the electrodes 40 and 40a is shut off and immediately the switch 199 is closed.

The rest of the operation is automatic and takes place in a short time, that is in less than 10 seconds. Closing of the switch 199 admits fluid to the pipe 220 and cylinder 37a and starts the ram 38 upwardly. The arm 310 closes the trip switch 209 just as the refractory piece 251 on the specimen ram 39 engages the specimen 29. The cone 253 enters a conical depression 29a in the specimen 29. The solenoid 187 is energized by the closing of the switch 209 which expands the unit 43 separating the electrodes 40 and 40a. A little later the blocks 46 and 46a move under the head 243 and just before they come to rest, the rod 52 closes the trip switch 51 which causes the release of the great pressure in the accumulator 67 through valve 119 into the main ram cylinder 121.

The auxiliary ram 38 pushes the specimen 29 part way into the mold liner 275. The main ram 37 pushes the specimen 29 the rest of the way, the specimen finally coming to rest in the refractory liner 274 and against the refractory plate 273. With the specimen fully in the mold the pressure builds up practically instantaneously to 30,000 atmospheres if the tank 62 contained 85 pounds of pressure. There the hot specimen continues to remain under this high pressure as long as desired, ten minutes being the usual period of high pressure. The plate 273 usually breaks and the refractory liner sleeve 274 may break but this is of no moment since the pieces serve as heat insulators.

When the specimen is deemed to have cooled so much that the pressing might as well be discontinued, the valve 65 is closed and the valve 309 is opened. Now the switch 148 is opened which de-energizes the relay 129 and the solenoid 125 and energizes the solenoid 126. This causes the piston 119a to move to the right closing valve 157 and opening valve 158 which allows the fluid in the cylinder 121 to exhaust via pipe 120 through valve 119 and out pipe 122 into the expansion tank 74. The main ram 37 now drops carrying with it the ram head 240, auxiliary ram 38, auxiliary ram head 243, hollow cylinder 245, block 246, and centering plate 247. Sometimes the specimen ram 39 moves downwardly with the main ram 37 but sometimes it sticks in the mold.

It now remains to remove the cavity block 31 from the plates 30 and open the mold. The ram parts including and above the head 243 are now removed and the auxiliary ram 38 is moved upwardly by closing the switch 199 (it was opened right after the full pressure was applied). The bolt 300 is now removed and the switch 199 is now opened again to allow the auxiliary ram 38 to move downwardly. The cavity block 31 comes down with it due to the use of the glycerine, graphite and lead foil. The cavity block is now removed from the press, is placed in a holding jig, and the plug 265 is unscrewed with a large wrench applied to the head 266. The rest of the mold parts may be removed with a small hydraulic press or in like manner.

The specimens operated upon were, in many cases, graphite blocks, it having been desired to ascertain the effect of the simultaneous application of great heat and high pressure on graphite. In some cases the specimens were diamonds which were embedded in graphite in order to provide blocks of the desired size and shape. Information was desired as to the thermal-pressure conditions under which the transformation from diamond to graphite would occur and the thermal-pressure conditions under which the transformation would not occur. Countless other materials can be studied with the apparatus of this invention and in many cases permanent changes of density can be achieved therewith.

It will thus be seen that there has been provided by this invention a method and an apparatus in which the various objects hereinabove set forth together with many thoroughly practical advantages are successfully achieved.

As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

We claim:

1. In apparatus of the class described, a main high pressure ram, an auxiliary ram in said main ram, a head on said auxiliary ram, blocks of a size to fit under said head and upon said main ram to transmit pressure directly from the main ram to the head of the auxiliary ram, and means to move said blocks in a direction at right angles to the direction of movement of said main ram under said head when said head rises.

2. In apparatus of the class described, a main high pressure ram, an auxiliary ram in said main ram, a head on said auxiliary ram, blocks of a size to fit under said head and upon said main ram to transmit pressure directly from said main ram to the head of said auxiliary ram, arms positioned to move said blocks in a direction at right angles to the movement of said main ram, and fluid pressure means to move said arms to place said blocks under said head when said head rises.

3. In apparatus of the class described, a pair of electrodes, a main high pressure ram, an auxiliary ram in said main ram, a head on said auxiliary ram located outside of said main high pressure ram, blocks of a size to fit under said head and upon said main ram to transmit pressure directly from the main ram to the head of the auxiliary ram, means to move said blocks under said head when said head rises, a specimen ram carried by said head to pick up a specimen held between said electrodes, and automatic means to separate said electrodes when said specimen ram contacts said specimen, whereby to heat the specimen, move it upwardly, and then to move it further with a force derived from said main high pressure ram.

4. In apparatus of the class described, a hydraulic press including a main ram, an auxiliary ram in said main ram, said auxiliary ram being movably mounted in said main ram, a head on said auxiliary ram, a plate having a tapered hole mounted on the press above the rams, a cavity block with a tapered outer surface fitting in said hole, the greatest diameter of the hole and the taper being on the under side, a tapered hole in the cavity block with the greatest diameter on the upper side, a plug blocking the upper side of the hole in the cavity block, a specimen ram carried by the head of the auxiliary ram, to be placed in the hole in the cavity block and pressed therein by said rams, a pair of blocks, and means to move said blocks between the main ram and the head of the auxiliary ram when the head rises.

5. In apparatus of the class described, a hydraulic press including a main ram, an auxiliary ram in said main ram, said auxiliary ram being movably mounted in said main ram, a head on said auxiliary ram, a plate having a tapered hole mounted on the press above the rams, a cavity block with a tapered outer surface fitting in said hole, the greatest diameter of the hole and the taper being on the under side, a tapered hole in the cavity block with the greatest diameter on the upper side, a plug blocking the upper side of the hole in the cavity block, a specimen ram carried by the head of the auxiliary ram, to be placed in the hole in the cavity block and pressed therein by said rams, a source of pressure for the main ram, a pair of blocks, means to move said blocks between the main ram and the head of the auxiliary ram when head rises, and means actuated by the means to move the blocks for applying the pressure to the main ram.

6. In apparatus of the class described, a main large area ram, a source of very high pressure fluid which can be connected to operate said main ram, an auxiliary small area ram, a source of relatively low pressure fluid which can be connected to operate said auxiliary ram, said auxiliary ram fitting in a cylindrical bore in said main ram, a head on said auxiliary ram, block means interposable between the under side of said head and said main ram to support said head from said main ram, and means to move the block means at right angles to the direction of movement of said main ram thus to interpose it between the underside of said head and said main ram whereby to move said head a considerable distance at low force by said auxiliary ram and then apply great force to said head by said main ram.

7. In apparatus as claimed in claim 6, the combination with the parts and features therein specified, of a mold and a specimen ram, the latter fitting in the former and one of the molds and the specimen ram being mounted on the head, whereby to apply pressure derived from the great force in the mold.

8. In apparatus as claimed in claim 6, the combination with the parts and features therein specified, of a mold and a specimen ram, the latter fitting in the former, and the area of the mold and of the specimen ram being less than that of the head, one of the molds and the specimen ram being mounted in the head, whereby to apply pressure derived from the great force in the mold said pressure being magnified from the force due to the difference in areas.

9. In apparatus of the class described, a press, a main ram of large diameter in said press, an auxiliary ram movable in a bore in the main ram, a block, a head on the auxiliary ram, means to move said block between the main ram and the head to support the head from the main ram after the auxiliary ram has moved, a mold and a specimen ram, one of said last two parts being carried by the head and the other being secured to the press, a pair of heating electrodes movably mounted on said press and positioned to heat a specimen when it is between the specimen ram and the mold, and means to separate the electrodes to allow the auxiliary ram to move the specimen ram and the mold relatively towards each other carrying the specimen into the mold, the movement of the head by the auxiliary ram allowing the block to move so that the main ram may exert the pressure.

10. Apparatus for applying heat of the order of 2000° C. to a specimen and then subjecting it to a pressure of the order of 20,000 atmospheres, comprising a ram, a pair of heating electrodes for heating the specimen electrically, a pair of arms movable to place said electrodes in contact with the specimen and to remove them from it, connections between said arms so that they will move synchronously, fluid pressure means for actuating said arms, insulation for said arms, flexible bus bars conveying electric current to said arms, a valve to admit fluid to said fluid pressure means, a solenoid to operate said valve, and a trip switch operated by said ram to cause separation of said electrodes when said ram moves.

11. Apparatus of the class described comprising a main ram, a cylinder containing said ram, an auxiliary ram, a cylinder containing said ram said cylinder being located concentrically in said main ram so that said auxiliary ram will move along the axis of said main ram, a mold into which a specimen is inserted by said auxiliary ram and placed under great pressure by said main ram, an auxiliary ram head removably fastened to said auxiliary ram, a centering ring on said auxiliary ram head, a heavy removable annular piece of metal on said ram head and centered by said ring, a removable cylindrical block in said annular piece of metal, a removable centering plate on said annular piece and said removable cylindrical block, a specimen ram removably mounted on said cylindrical block and located by said centering plate and of a size to fit said mold, a pair of blocks interposable between said ram head and said main ram, and a pair of arms movable to place said blocks in the position just set forth.

12. Apparatus of the class described comprising a hydraulic press, a main ram in said press, a mold in said press, an auxiliary ram mounted on said main ram to move upwardly under a specimen and carry it into said mold, fluid pressure means for actuating said main ram and said auxiliary ram, a head on said auxiliary ram, blocks interposable between said main ram and the head of said auxiliary ram to allow direct application of high pressure by said main ram to the specimen in the mold with little movement by said main ram, means to place said blocks in the position specified, a pair of electrodes, arms movable to hold said electrodes adjacent each other holding a specimen between them just above the auxiliary ram before it moves, and means actuated by the movement of the auxiliary ram to move said arms apart to separate said electrodes to free the specimen so that it can be carried into said mold by said auxiliary ram.

13. Apparatus of the class described comprising a press base, a high pressure hydraulic ram in said base, a cylinder in said high pressure hydraulic ram, an auxiliary hydraulic ram in said cylinder, a head on said auxiliary ram, a press cap, columns holding said base and said cap together, a mold secured under said cap into which a specimen may be inserted and subjected to pressure, means for heating the specimen to a high temperature consisting of a pair of electrodes between which the specimen is gripped and heated, means for raising the heated specimen from between the electrodes and rapidly introducing it into said mold where it is placed under high pressure comprising a specimen ram mounted upon said auxiliary ram said specimen ram being shaped to fit tightly into the bottom of the mold, blocks insertable between said high pressure ram and the head of said auxiliary ram, means for moving said electrodes apart for clear passage of said specimen ram, and means automatically placing said blocks between the high pressure ram and the head of the specimen ram when the auxiliary ram has risen high enough to permit same to be done.

14. In apparatus of the class described, a hydraulic press including a main ram, an auxiliary ram mounted in said main ram, a head on said auxiliary ram, a pair of electrodes, a pair of electrode supporting arms to move said pair of electrodes together and apart, a pair of blocks, a pair of arms to set in place said pair of blocks between the main ram and the head of the auxiliary ram to transfer high pressure exerted by said main ram directly through said head to a specimen in a mold, a hard block upon the head of the auxiliary ram, a specimen ram removably mounted upon the last named block, and fluid pressure means to move both of said pairs of arms.

15. In apparatus of the class described, a main ram, an auxiliary ram mounted in said main ram movable parallel thereto, high fluid pressure means to operate said main ram, low fluid pressure means to operate said auxiliary ram, a plate having a tapered hole secured in position above said rams, a cavity block with a tapered outer surface fitting in said hole, the greatest diameter of the hole and of the taper being on the underside, a tapered hole in the cavity block with the greatest diameter on the upper side, a plug blocking the upper side of the hole in the cavity block, a mold in the tapered hole in the cavity block, a specimen ram mounted upon said auxiliary ram and shaped to fit tightly in said mold, said auxiliary ram being operable to raise said specimen ram to insert a specimen rapidly into said mold, means rapidly to lock said auxiliary ram to said main ram when the former has moved a certain distance, and automatic means to cause said high fluid pressure means to operate said main ram immediately said auxiliary ram is locked to said main ram.

16. In apparatus of the class described, a main ram, an auxiliary ram mounted in said main ram movable parallel thereto, high fluid pressure means to operate said main ram, low fluid pressure means to operate said auxiliary ram, a mold, a specimen ram mounted upon said auxiliary ram and shaped to fit tightly in said mold, said auxiliary ram being operable to raise said specimen ram to insert a specimen rapidly into said mold, a head on said auxiliary ram, a pair of blocks slidable across the working face of said main ram under said head said blocks being shaped to fit closely to said auxiliary ram said head and said blocks constituting means rapidly to lock said auxiliary ram to said main ram when the former has moved a certain distance, and automatic means to operate said main ram immediately said auxiliary ram is locked to said main ram.

17. In apparatus of the class described, a ram movable in a given direction, a pair of heating electrodes to heat a specimen, a pair of conductive supports upon which said electrodes are mounted the supports being movable in a plane perpendicular to said given direction to cause the electrodes to approach and separate, means for insulating said supports, flexible bus bars to convey electric current through said supports to said electrodes, means to actuate said supports, and means operated by said ram to cause the means to move the supports to separate the electrodes.

18. Apparatus of the class described comprising a hydraulic press, means including electrodes associated with said press for heating a specimen to a high temperature said electrodes being mounted for movement toward and away from each other to heat said specimen and then to release it, a press cylinder, a main ram in said press cylinder, a cylinder formed in the main ram, an auxiliary ram in said last named cylinder, a head on said auxiliary ram, a flexible fluid pressure line connected to the main ram, and connections in said main ram from the flexible fluid pressure line to the cylinder in said main ram.

19. Apparatus of the class described comprising a mold, a ram associated with a hydraulic press to carry a specimen rapidly to said mold mounted in said press and inject said specimen into said mold, a specimen ram mounted upon said ram shaped to fit in said mold, a refractory seat mounted upon said specimen ram for the purpose of picking up the specimen which is hot and injecting it into said mold without melting or fusing said specimen ram, a hard block to support said specimen ram upon said ram, a reinforcing ring around said block to prevent rupture thereof, a cavity block for said mold having a tapered outer surface tapering in the direction in which said rams move, and a supporting element for said cavity block having a tapered inner surface fitting the tapered outer surface of said cavity block.

20. Apparatus of the class described comprising a hydraulic press having a main ram, electrode means for heating a specimen to high temperatures by passing electric current therethrough, a mold in said press in which said specimen is placed under high pressure by said press, means to place said heated specimen rapidly into said mold for the purpose of exerting high pressure upon it comprising an auxiliary hydraulic ram additional to said main ram associated with said press which lifts said heated specimen rapidly into said mold, fluid pressure means for actuating said auxiliary ram, means responsive to movement of said auxiliary ram by the fluid pressure means therefor to move the electrode means away from the specimen, further means operated after said auxiliary ram has moved for coupling the auxiliary ram to the main ram and fluid pressure means to operate the main ram after the auxiliary ram is coupled thereto whereby to exert high pressure on the heated specimen in the mold.

21. Apparatus of the class described comprising a hydraulic press having a main ram, electrode means for heating a specimen to high temperatures by passing electric current therethrough, a cavity block in said press, a mold in said cavity block in which said specimen is placed under high pressure, insulation in said mold for insulating said cavity block from the heat of said heated specimen, a specimen ram shaped to fit tightly in said mold, an auxiliary ram additional to said main ram for moving said specimen into said mold, said specimen ram being attached to said auxiliary ram and said auxiliary ram being located in said main ram, fluid pressure means to actuate said auxiliary ram, means responsive to movement of said auxiliary ram by the fluid pressure means therefor to move the electrode means away from the specimen, further means operated after said auxiliary ram has moved for coupling the auxiliary ram to the main ram, and fluid pressure means to operate the main ram after the auxiliary ram is coupled thereto whereby to exert high pressure on the heated specimen in the mold.

22. Apparatus of the class described comprising a hydraulic press including a mold, means associated with said press for heating a specimen to high temperatures comprising a pair of electrodes which grip said specimen between them, a pair of electrically conductive members upon which said electrodes are mounted movable to move said electrodes together and apart, means to conduct electric current through said members to said electrodes, fluid pressure means for actuating said members, a valve to admit fluid to said fluid pressure means, a solenoid to operate said valve, electric switches to operate said solenoid, and means for rapidly transferring a heated specimen from between said electrodes into the mold where pressure is applied upon it by said press.

23. Apparatus of the class described comprising a hydraulic press, means associated with said press for heating a specimen to high temperatures comprising a pair of electrodes, a main ram of said press, an auxiliary ram movable as an extension of the main ram to place the heated specimen in a mold, a head on said auxiliary ram, a pair of blocks interposable between the surface of said main ram and the head of said auxiliary ram to form a rigid metal column between said main ram and said specimen, a pair of arms upon which said electrodes are mounted which are movable to bring said electrodes together and apart, a pair of arms movable to place said blocks between said main ram and said auxiliary ram head, a mounting to secure both of said pair of arms to said press at their axes of movement consisting of a pair of metal columns mounted parallel to each other and to the axes of said main ram and said auxiliary ram.

24. Apparatus of the class described comprising a hydraulic press, a main ram, an auxiliary ram mounted to move as an extension of the main ram for rapidly lifting a specimen into a mold, a head on said auxiliary ram, a pair of blocks interposable between the face of said main ram and the head of said auxiliary ram to form a rigid metal column between said main ram and said specimen so that pressure may be exerted upon it in said mold by said main ram, means for placing said blocks consisting of a pair of arms movable to slide said blocks together in place, means for connecting said arms so that they will move synchronously consisting of a pair of gears one of which is mounted upon each of said arms at the axis of its turning point so that said gears will mesh together and one of which is adjustably mounted upon its arm.

25. Apparatus of the class described comprising an hydraulic press, means associated with said press for heating a specimen to high temperatures comprising a pair of heating electrodes, a pair of electrode supporting arms each of which is pivotally connected to the press said arms being movable to bring said electrodes together and apart, and means for connecting said arms so that they will move synchronously comprising a pair of gears one of which is mounted upon each of said arms.

PERCY W. BRIDGMAN.
RAYMOND R. RIDGWAY.
EDWARD VAN der PYL.

REFERENCES CITED

The following references are of record in the file of this patent:

UNITED STATES PATENTS

| Number | Name | Date |
|---|---|---|
| 301,329 | Beck | July 1, 1884 |
| 1,652,940 | Hottell | Dec. 13, 1927 |
| 1,965,106 | McDougall | July 3, 1934 |
| 2,082,904 | Podany | June 8, 1937 |
| 2,085,105 | Lex | June 29, 1937 |
| 2,403,912 | Doll | July 16, 1946 |
| 2,420,405 | Alves | May 13, 1947 |
| 2,423,914 | Wacker | July 15, 1947 |